US012167141B2

United States Patent
Muramatsu et al.

(10) Patent No.: US 12,167,141 B2
(45) Date of Patent: Dec. 10, 2024

(54) IMAGING SYSTEM INCLUDING DIFFERENCE IMAGE GENERATOR THAT GENERATES DIFFERENCE IMAGES

(71) Applicant: KOITO MANUFACTURING CO., LTD., Tokyo (JP)

(72) Inventors: Takao Muramatsu, Shizuoka (JP); Kazutaka Kitamura, Shizuoka (JP); Tsukasa Tokida, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 134 days.

(21) Appl. No.: 17/945,413

(22) Filed: Sep. 15, 2022

(65) Prior Publication Data

US 2023/0017893 A1    Jan. 19, 2023

Related U.S. Application Data

(63) Continuation of application No. PCT/JP2021/011356, filed on Mar. 19, 2021.

(30) Foreign Application Priority Data

Mar. 23, 2020 (JP) ................. 2020-051232
Mar. 27, 2020 (JP) ................. 2020-058081

(51) Int. Cl.
  *H04N 23/71* (2023.01)
  *B60Q 1/24* (2006.01)
  (Continued)

(52) U.S. Cl.
  CPC ............. *H04N 23/71* (2023.01); *B60Q 1/249* (2022.05); *G06V 20/582* (2022.01); *H04N 23/56* (2023.01); *H04N 23/72* (2023.01)

(58) Field of Classification Search
  CPC ........ H04N 23/71; H04N 23/56; H04N 23/72; H04N 23/74; B60Q 1/249; B60Q 1/14;
  (Continued)

(56) References Cited

U.S. PATENT DOCUMENTS

2011/0187899 A1    8/2011  Mitani et al.
2012/0320218 A1   12/2012  Mori et al.
2019/0320106 A1   10/2019  Tatara et al.

FOREIGN PATENT DOCUMENTS

CN   102783137 A   11/2012
CN   110087946 A    8/2019
(Continued)

OTHER PUBLICATIONS

JP 2002-230563 Translation (Year: 2002).*
(Continued)

*Primary Examiner* — Twyler L Haskins
*Assistant Examiner* — Angel L Garces-Rivera
(74) *Attorney, Agent, or Firm* — BUCHANAN, INGERSOLL & ROONEY PC

(57) ABSTRACT

An imaging system includes a light emitter that emits light toward the surroundings of a vehicle, an imager that captures an image of a range including a region that is illuminated with light emitted by the light emitter, and a difference image generator that generates (n−1) difference images from n captured images captured by the imager (n is an integer no smaller than 3). The difference image generator generates a difference image based on an image included in the n captured images and captured while the light emitter is on and an image included in the n captured images and captured while the light emitter is dimmed.

15 Claims, 13 Drawing Sheets

(51) Int. Cl.
*G06V 20/58* (2022.01)
*H04N 23/56* (2023.01)
*H04N 23/72* (2023.01)

(58) Field of Classification Search
CPC ........... B60Q 2300/054; G06V 20/582; G06V 10/141; G06V 20/58; G03B 15/00; G03B 15/03; G03B 17/02; G06T 1/00; G06T 7/00
See application file for complete search history.

(56) References Cited

FOREIGN PATENT DOCUMENTS

| | | |
|---|---|---|
| JP | 2002230563 A | 8/2002 |
| JP | 2003087644 A | 3/2003 |
| JP | 2010050535 A | 3/2010 |
| JP | 2010235045 A | 10/2010 |
| JP | 2018142887 A | 9/2018 |

OTHER PUBLICATIONS

International Preliminary Report on Patentability Chapter I (PCT/IB/373) mailed on Sep. 22, 2022 and Written Opinion (PCT/ISA/237) with translation mailed on Jun. 15, 2021, by The International Bureau of WIPO in corresponding International Patent Application No. PCT/JP2021/011356. (9 pages).

International Search Report (PCT/ISA/210) with translation mailed on Jun. 15, 2021, by the Japan Patent Office as the International Searching Authority for International Application No. PCT/JP2021/011356. (5 pages).

Office Action (Notification of the First Office Action) issued on Oct. 27, 2023, in corresponding Chinese Patent Application No. 202180023448.3 and English translation of the Office Action. (18 pages).

Office Action (Notification of Reason(s) for Refusal) issued on Feb. 6, 2024, in corresponding Japanese Patent Application No. 2022-510420 and machine English translation of the Office Action. (7 pages).

\* cited by examiner

IMAGING SYSTEM INCLUDING DIFFERENCE IMAGE GENERATOR THAT GENERATES DIFFERENCE IMAGES

BACKGROUND OF THE INVENTION

1. Field of the Invention

The present disclosure relates to imaging systems.

2. Description of the Related Art

To date, an illumination controlling device has been devised that can set an illumination region such that a region where illumination from a host vehicle has a large influence on the visibility is illuminated appropriately with illumination light (see patent document 1). This illumination controlling device can set an illumination region such that a region where illumination from a host vehicle has a large influence on the visibility of the driver is illuminated appropriately with illumination light, based on a difference image between a light-on image captured while the illumination light is on and a light-off image captured while the illumination light is off.

[patent document 1] JP2010-235045

When a situation of a region ahead of a vehicle is determined based on a difference image between a light-on image captured while illumination light is on and a light-off image captured while illumination light is off, the number of difference images is one half the number of captured images. Meanwhile, information regarding a change in a situation of a region ahead of a vehicle that occurs within a period between a light-off image of a certain difference image and a light-on image of the next difference image is not reflected on either of the difference images.

An image captured outside the limit of the dynamic range of a camera experiences white-clipping or black-clipping. For example, if illumination light is too bright when a light-on image is captured, a target to be identified may be white-clipped, or if ambient light is too dark when illumination light is off, a target to be identified may be black-clipped. Accordingly, illumination of appropriate brightness is necessary when an image of a region ahead of a vehicle is captured.

SUMMARY OF THE INVENTION

The present disclosure has been made in view of such circumstances, and one exemplary object of the present disclosure is to provide a novel technique for identifying a situation surrounding a vehicle with higher accuracy.

Another exemplary object of the present disclosure is to provide a novel technique for identifying a situation surrounding a vehicle with higher accuracy.

In addressing the above issues, an imaging system according to one aspect of the present disclosure includes a light emitter that emits light toward the surroundings of a vehicle, an imager that captures an image of a range including a region that is illuminated with light emitted by the light emitter, and a difference image generator that generates (n−1) difference images from n captured images captured by the imager (n is an integer no smaller than 3). The difference image generator generates a difference image based on an image included in the n captured images and captured while the light emitter is on and an image included in the n captured images and captured while the light emitter is dimmed.

An imaging system according to another aspect of the present disclosure includes a light emitter that emits light toward the surroundings of a vehicle, an imager that captures an image of a range including a region that is illuminated with light emitted by the light emitter, and a difference image generator that generates (n−1) difference images from n captured images captured by the imager. The difference image generator generates a difference image based on a first captured image included in the n captured images and captured while the light emitter emits light at a first luminous intensity $C1$ and a second captured image included in the n captured images and captured while the light emitter emits light at a second luminous intensity $C2$ ($0<C2<C1$).

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

12C illustrates a captured image 3 acquired by a camera at a timing at which a lamp provides illumination at a luminous intensity C3.

DETAILED DESCRIPTION OF THE INVENTION

Outline of the Embodiments

Figure 1:
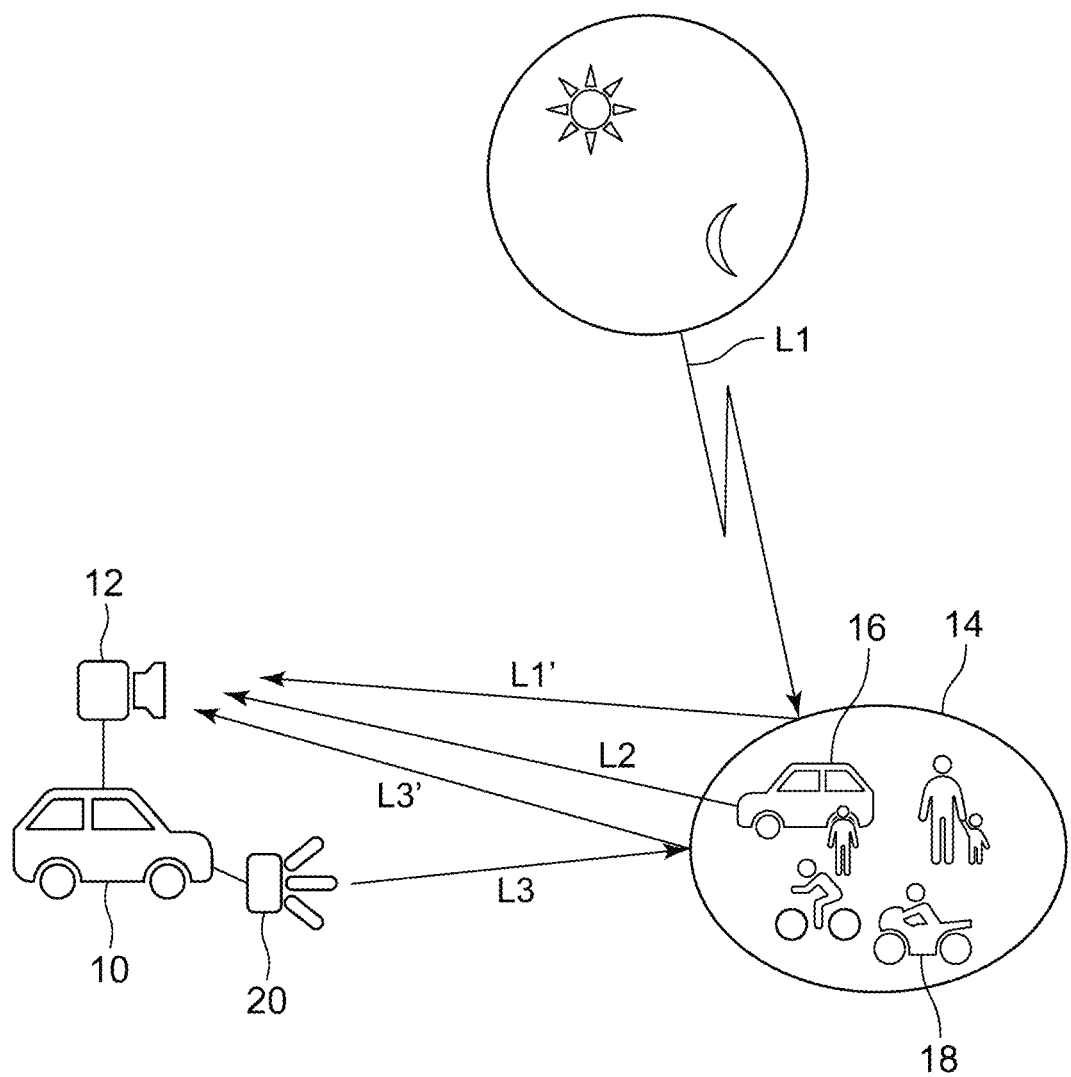
FIG. 1 is a schematic diagram for describing various kinds of light that a camera included in a vehicle acquires.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

An imaging system according to one aspect of the present disclosure includes a light emitter that emits light toward the surroundings of a vehicle, an imager that captures an image of a range including a region that is illuminated with light emitted by the light emitter, and a difference image generator that generates (n−1) difference images from n captured images captured by the imager (n is an integer no smaller than 3). The difference image generator generates a difference image based on an image included in the n captured images and captured while the light emitter is on and an image included in the n captured images and captured while the light emitter is dimmed.

According to this mode, (n−1) difference images that are only one less in number than n captured images are obtained, and thus a desired number of difference images can be obtained without much increasing the frame rate. This configuration makes it possible to identify a situation surrounding a vehicle with higher accuracy by use of a larger number of difference images within a predetermined time.

In one embodiment, the imager may acquire the n captured images in n consecutive frames. Thus, as compared to the case where n captured images are acquired in n nonconsecutive frames, information on a change in the situation surrounding a vehicle that has arisen between two difference images is less likely to be left out.

In one embodiment, the difference image generator may generate a first difference image from a first captured image acquired in a first frame and captured while the light emitter is on and a second captured image acquired in a second frame following the first frame and captured while the light emitter is dimmed, and generate a second difference image from a third captured image acquired in a third frame following the second frame and captured while the light emitter is on and the second captured image. Thus, two difference images are generated from three consecutive captured images. The difference images each represent a difference between a captured image captured while the light emitter is on and a captured image captured while the light emitter is dimmed (including while being off). Therefore, an influence of light from the surrounding environment is suppressed. In other words, the region that is illuminated with light emitted by the light emitter is mainly captured, and thus an influence of light from the surrounding environment or a shadow associated with such light is reduced, and this leads to an increase in the accuracy of image recognition where a difference image generated from captured images is used.

In one embodiment, the light emitter may be configured to be capable of emitting light at a luminous intensity that is no less than 10 times a normal luminous intensity of a light source included in a vehicle lamp. This configuration can further suppress an influence of light from the surrounding environment.

In one embodiment, the imager may be exposed for a duration of T/x (x>1) within one frame period, wherein T represents one frame period, and the light emitter may be configured to be capable of emitting light within the duration of T/x and emitting light at a luminous intensity that is no less than x times a luminous intensity of the light source. In this manner, the exposure time can be shortened as light is emitted at a high output power in a short period of time. As a result, the proportion of an influence of ambient light (e.g., the sunlight) on a captured image can be reduced.

The light emitter may emit light at a peak wavelength of 940±20 nm. Light of such a near-infrared wavelength is not included in ambient light in a large amount. Therefore, as ambient light and light of a near-infrared wavelength are differentiated by the imager, a situation surrounding a vehicle illuminated with the light of a near-infrared wavelength can be identified with high accuracy.

An imaging system according to another aspect of the present disclosure includes a light emitter that emits light toward the surroundings of a vehicle, an imager that captures an image of a range including a region that is illuminated with light emitted by the light emitter, and a difference image generator that generates (n−1) difference images from n captured images captured by the imager. The difference image generator generates a difference image based on a first captured image included in the n captured images and captured while the light emitter emits light at a first luminous intensity C1 and a second captured image included in the n captured images and captured while the light emitter emits light at a second luminous intensity C2 (0<C2<C1).

According to this aspect, a difference image is generated based on at least two captured images captured under an illumination condition where the light emitter emits light at different luminous intensities. Accordingly, a difference image that includes a target of identifiable brightness is more likely to be obtained while an influence of ambient light is reduced.

In one embodiment, the difference image generator may generate a difference image based on the first captured image and a third captured image captured while the light emitter emits light at a third luminous intensity C3 (C2<C3<C1). With this configuration, two difference images are generated in which the differences in the luminous intensity of the light emitter held when two captured images are captured differ from each other (C1−C2, C1−C3). Accordingly, the likelihood that at least one of the difference images includes a target of identifiable brightness increases.

In one embodiment, the imager may acquire the n captured images in n consecutive frames. Thus, as compared to the case where n captured images are acquired in n nonconsecutive frames, information on a change in the situation surrounding a vehicle that has arisen between two difference images is less likely to be left out.

In one embodiment, the difference image generator may generate a first difference image from the first captured image and the second captured image, and generate a second difference image from the first captured image and the third captured image.

In one embodiment, the imaging system may further include an identifier that identifies a plurality of signs in the surroundings of the vehicle. The identifier may identify a first sign included in the plurality of signs from the first difference image, and identify a second sign included in the plurality of signs from the second difference image. This configuration increases the number of identifiable signs.

In one embodiment, the identifier may identify the first sign located closer to the vehicle than the second sign from the first difference image, and identify the second sign located farther from the vehicle than the first sign from the second difference image. Thus, even in a case where a plurality of signs are present at different distances, both signs can be identified.

In one embodiment, the light emitter may be configured to be capable of emitting light at a luminous intensity that is no less than 10 times a normal luminous intensity of a light source included in a vehicle lamp. This configuration can further suppress an influence of light from the surrounding environment.

In one embodiment, the imager may be exposed for a duration of T/x (x>1) within one frame period, wherein T represents one frame period, and the light emitter may be configured to be capable of emitting light within the duration of T/x and emitting light at a luminous intensity that is no less than x times a luminous intensity of the light source. In this manner, the exposure time can be shortened as light is emitted at a high output power in a short period of time. As a result, the proportion of an influence of ambient light (e.g., the sunlight) on a captured image can be reduced.

In one embodiment, the light emitter may emit light at a peak wavelength of 940±20 nm. Light of such a near-infrared wavelength is not included in ambient light in a large amount. Therefore, as ambient light and light of a near-infrared wavelength are differentiated by the imager, a situation surrounding a vehicle illuminated with the light of a near-infrared wavelength can be identified with high accuracy.

Embodiments

Hereinafter, some embodiments for implementing the present disclosure will be described in detail with reference to the drawings. In the description of the drawings, identical elements are given identical reference characters, and duplicate description thereof will be omitted as appropriate. The configurations described below are illustrative in nature and do not limit the scope of the present disclosure or invention in any way.

First Embodiment

FIG. 1 is a schematic diagram for describing various kinds of light that a camera included in a vehicle acquires. In image recognition used in advanced driver-assistance systems (ADASs) or automatic driving in recent years, recognition is performed through AI or machine learning based on images acquired by a camera 12 included in a vehicle 10. However, an influence of surrounding light or a shadow cast by such light when an image is acquired poses a problem. For example, light that enters the camera 12 includes reflected light 1' from traffic participants illuminated by natural ambient light L1, which includes light from the sun or the moon. Herein, traffic participants 14 are targets that the vehicle needs to recognize for ADAS or automatic driving and include, for example, an automobile, a bicycle, a motorcycle, a pedestrian, a traffic sign, or a signal light.

Illumination light L2 from a lamp of, among the aforementioned traffic participants 14, an automobile 16 or a motorcycle 18 or illumination light L2 from an illuminating device such as a signal light also enters the camera 12. In addition, illumination light L3 emitted by a lamp 20, serving as a light emitter of the vehicle 10, toward the surroundings of the vehicle illuminates a traffic participant 14, and reflected light L3' from that traffic participant 14 also enters the camera 12. In this manner, various kinds of light enter the camera, and identifying which light has caused which bright portion or shadow in a single image is not easy.

Specific examples at nighttime include a contrast created by light L2 in the surroundings or light L3 formed by a low beam cut-off line of the vehicle 10. During the daytime, a shadow created by natural ambient light L1 from the sun and a building reduces recognition accuracy. At dusk, the surroundings become darker, making it difficult to see things, but illuminating the surroundings with light from the headlamps of the vehicle 10 yields little effect, and the recognition is difficult. Even at the same location, how a shadow is formed differs depending on how light is cast, and thus it is conceivable that training of AI or machine learning needs to be done in consideration with various scenes.

Accordingly, in view of the issues above, the inventors of the present application have conceived of a possibility of acquiring stable images that are not affected by surrounding ambient light and that have no shadow by detecting only reflected light L3' of light L3 coming from a host vehicle. Specifically, the following techniques can be considered as methods for efficiently taking in only a reflection of light coming from a host vehicle without being affected by external light.

(Technique 1) A wavelength of light for illumination is selected. For example, light in a wavelength band (near-infrared radiation of 940±20 nm) that is relatively scarce among ambient light is used.

(Technique 2) With an exposure time of a camera set short, light of a high output power in pulse-wise is emitted in synchronization with the exposure time. Thus, light from a host vehicle is taken in efficiently while keeping external light from being taken in.

(Technique 3) In order to further remove an influence of surrounding light, an image 1 is acquired through exposure at a first timing in synchronization with illumination of light from a host vehicle. Then, an image 2 is acquired through exposure of a camera at a second timing without any illumination of light from the host vehicle. Thereafter, a difference image between the image 1 and the image 2 is generated, and thus light other than the illumination light from the host vehicle is canceled.

Combining Techniques 1 to 3 above can further reduce an influence of surrounding light. Although near-infrared radiation having a peak wavelength of around 940 nm is used in Technique 1, with use of visible light, for example, Technique 2 and Technique 3 may be combined. In a case where visible light is used, the light source may double as daytime running lamps (DRLs).

With regard to an influence of light, the sunlight during the daytime is at 1,000,000 $cd/m^2$, and the illumination light of a host vehicle is at 10,000 $cd/m^2$ on average (e.g., the output is 10 W on average). Herein, if the illumination light of the host vehicle is output at an average of 10 W with a duty cycle of 1%, an instantaneous output of 1,000 W can be achieved, and then the luminance is 1,000,000 $cd/m^2$.

Then, if the exposure time of a camera is synchronized with a duty cycle of 1%, illumination with brightness equivalent to the luminance held during the daytime can be achieved. Furthermore, as a difference between two images is obtained as in Technique 3, a video image reflecting only an influence of the illumination light of the host vehicle can be acquired even during the daytime. At this point, if reflected light that the camera receives is limited to near-infrared radiation having a peak wavelength of around 940 nm, an even clearer image can be acquired.

Figure 2:
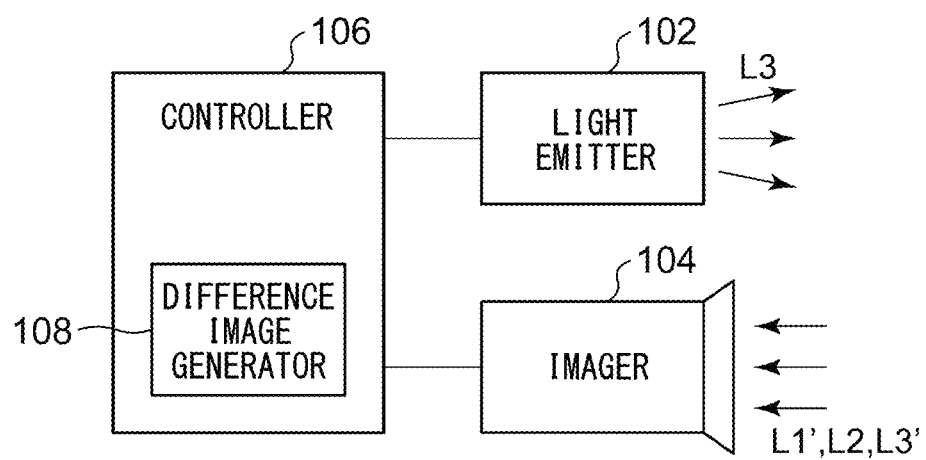
FIG. 2 is a block diagram of an imaging system according to an embodiment.

FIG. 2 is a block diagram of an imaging system 100 according to the present embodiment. As illustrated in FIG. 2, the imaging system 100 includes a light emitter 102 that emits light toward the surroundings of the vehicle, an imager 104 that captures an image of a range including a region that is illuminated with light emitted by the light emitter 102, and a controller 106 that controls the intensity or an emission timing at which the light emitter 102 emits light or the sensitivity or an imaging timing of the imager. The controller 106 includes a difference image generator 108 that generates a difference image from a plurality of captured images captured by the imager 104.

Figure 3:
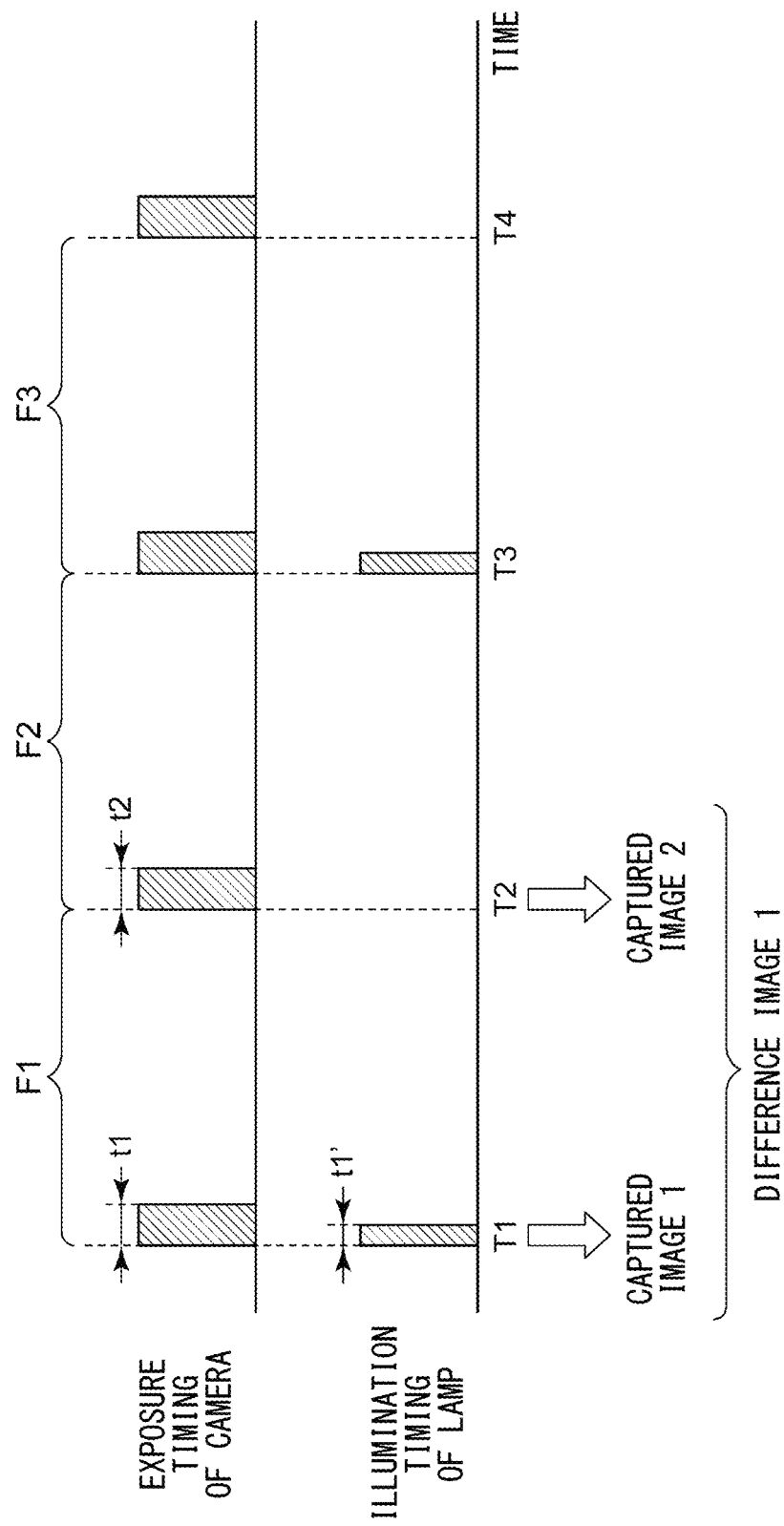
FIG. 3 is a schematic diagram illustrating an example of image processing performed by an imaging system according to an embodiment.

FIG. 3 is a schematic diagram illustrating an example of image processing performed by the imaging system according to the present embodiment. As illustrated in FIG. 3, the camera captures images of the surroundings of the vehicle successively at a predetermined frame rate. Specifically, at a timing T1 of a frame F1, the camera starts the exposure (time t1) and the lamp starts the illumination (time t1'≤time t1). As a result, a first captured image 1 is obtained. Next, at a timing T2 of a frame F2, the camera starts the exposure (time t2=time t1), but the lamp provides no illumination (or is dimmed). As a result, a second captured image 2 is obtained.

The captured image 1 includes information on reflected light L1' of natural ambient light L1 illustrated in FIG. 1, illumination light L2 from a traffic participant 14, and reflected light L3' of the light that the lamp 20 has emitted. Meanwhile, the captured image 2, since being captured while the lamp 20 is off, includes no information on reflected light L3' and includes information only on reflected light L1' and illumination light L2. Therefore, the difference image generator 108 of the controller 106 generates a difference image 1 from the captured image 1 and the captured image 2.

With this operation, the difference image 1 including information only on the reflected light L3' is obtained, and an influence of the reflected light L1' of the natural ambient light L1 or the illumination light L2 from the traffic participant 14 can be suppressed. This results in an increase in the accuracy of recognizing a situation by use of a captured image or a difference image in ADAS or automatic driving.

Figure 4:
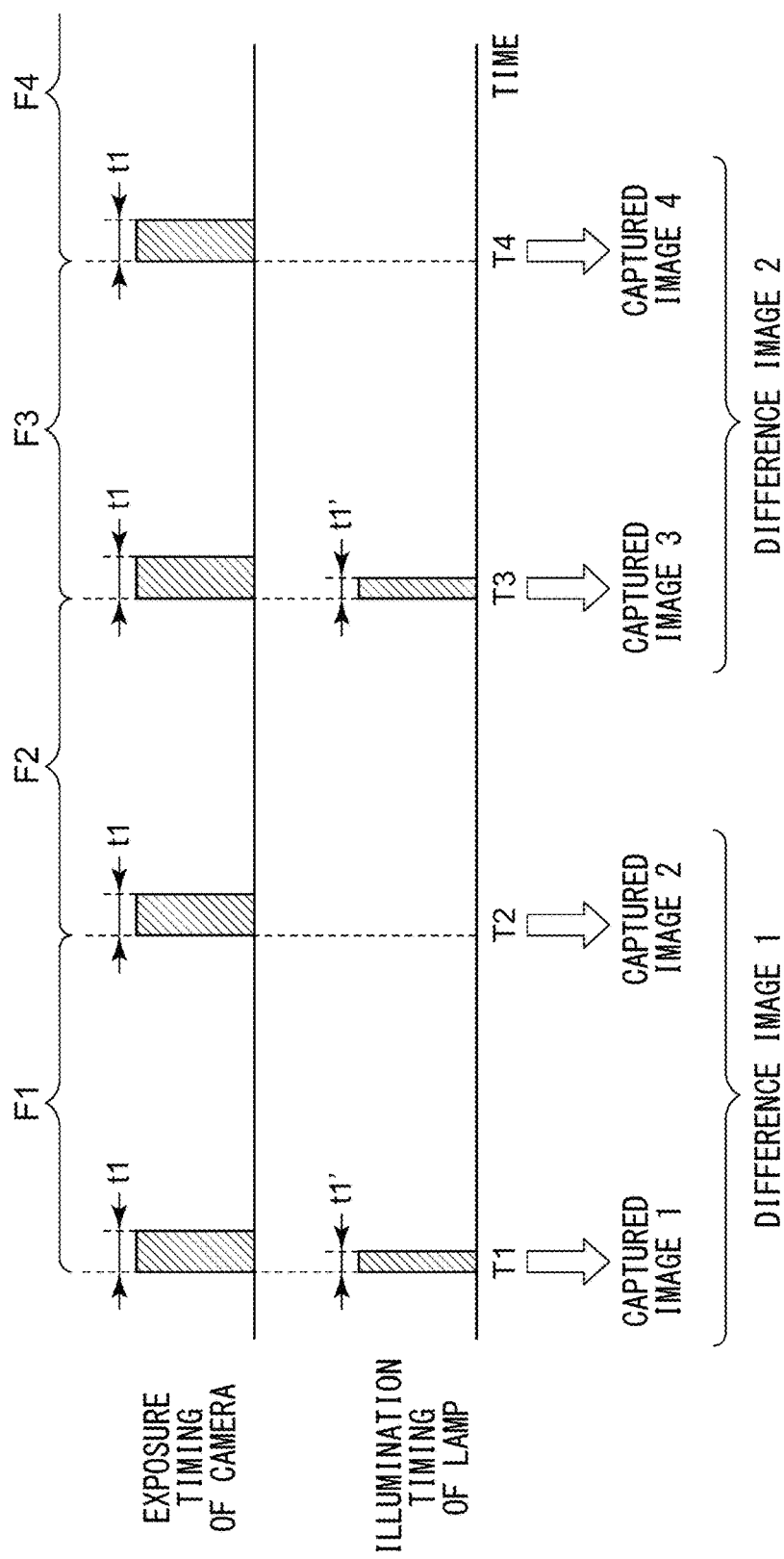
FIG. 4 is a schematic diagram illustrating a reference example of image processing performed by an imaging system.

Next, a method of acquiring a number of difference images without much increasing the frame rate will be described. In a case described first, one difference image is generated from two specific captured images. FIG. 4 is a schematic diagram illustrating a reference example of image processing performed by an imaging system. As illustrated in FIG. 4, four captured images 1 to 4 are obtained in respective frames F1 to F4. The captured image 1 and the captured image 3 are images captured under the illumination from the lamp, and the captured image 2 and the captured image 4 are images captured with no illumination from the lamp.

In the imaging system according to the reference example, a difference image 1 that includes information only on reflected light L3' is obtained from the captured image 1 and the captured image 2, and a difference image 2 that includes information only on reflected light L3' is obtained from the captured image 3 and the captured image 4. However, the number of difference images obtained from four captured images of the respective frames is two, and if four difference images are to be acquired in the same length of time, the frame rate needs to be increased twofold.

In addition, information included in the difference image 1 and the difference image 2 does not include any change in the situation that has arisen in the surroundings of the vehicle during a period from when the exposure of the camera and the illumination of the lamp have ended in the frame F2 (T2+t1) to a timing T3 at which the imaging starts in the frame F3. In other words, there may be a lack of information in a certain period.

Figure 5:
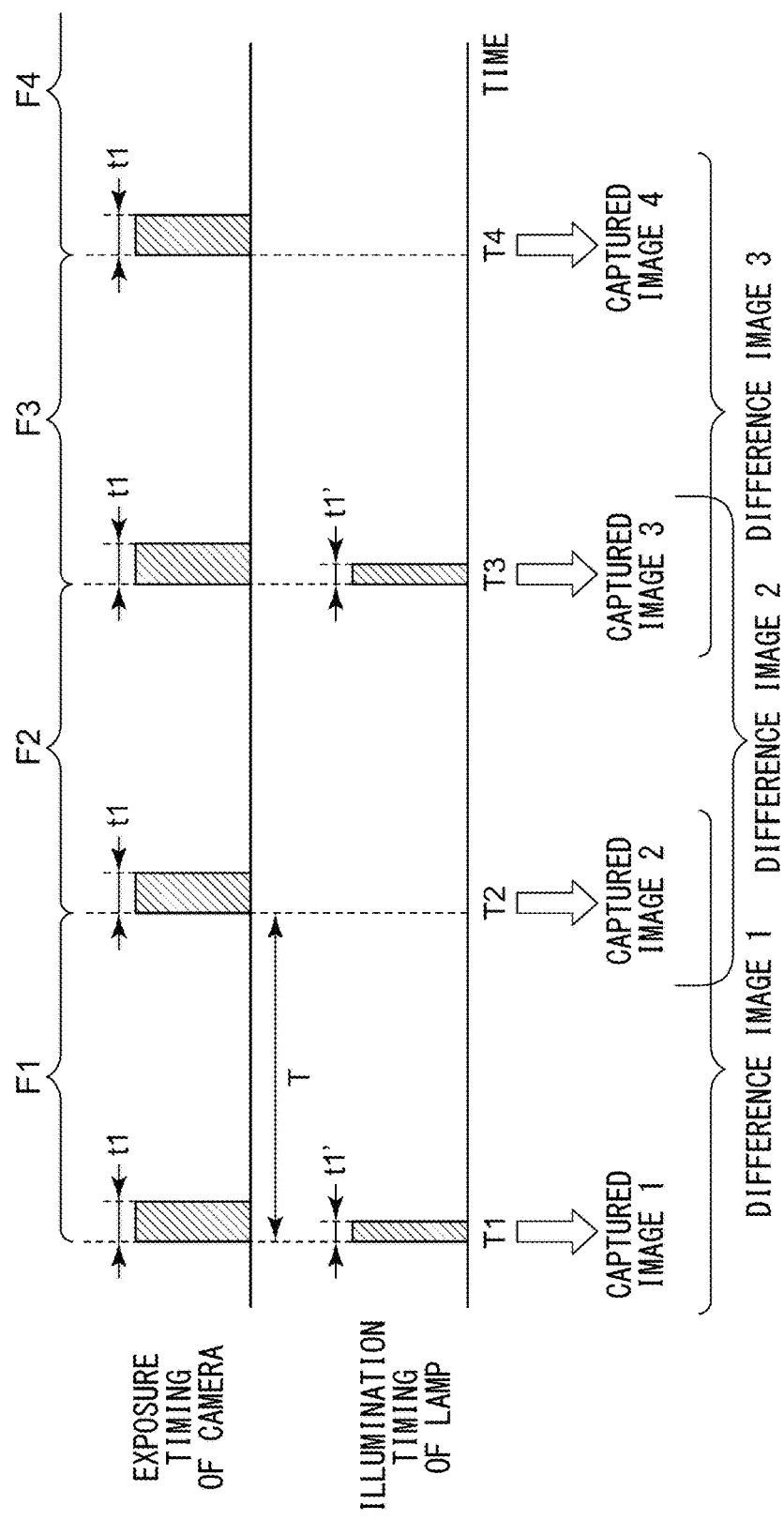
FIG. 5 is a schematic diagram illustrating another example of image processing performed by an imaging system according to an embodiment.

FIG. 5 is a schematic diagram illustrating another example of image processing performed by the imaging system according to the present embodiment. The difference image generator 108 of the imaging system 100 according to the present embodiment generates (n−1) difference images from n captured images (n is an integer no smaller than 3). The difference image generator 108 generates a difference image based on an image included in the n captured images and captured while the light emitter is on and an image included in the n captured images and captured while the light emitter is dimmed. In the case described below, three difference images are generated from four captured images.

As illustrated in FIG. 5, four captured images 1 to 4 are obtained in respective frames F1 to F4. The captured image 1 and the captured image 3 are images captured under the illumination from the lamp, and the captured image 2 and the captured image 4 are images captured with no illumination from the lamp (or while the lamp is dimmed).

In the imaging system 100 according to the present embodiment, a difference image 1 that includes information only on reflected light L3' is obtained from the captured image 1 and the captured image 2, a difference image 2 that includes information only on reflected light L3' is obtained from the captured image 2 and the captured image 3, and a difference image 3 that includes information only on reflected light L3' is obtained from the captured image 3 and the captured image 4.

According to this mode, three difference images that are only one less in number than the four captured images are obtained, and thus a desired number of difference images can be obtained without much increasing the frame rate. In a similar manner, 59 difference images can be obtained from 60 captured images, and thus difference images in a number that does not differ much from the number of the captured images can be obtained with little change in the frame rate. This configuration makes it possible to identify a situation surrounding a vehicle with higher accuracy by use of a larger number of difference images within a predetermined time.

In the example illustrated in FIG. 5, the imager 104 acquires the four captured images 1 to 4 in the four consecutive frames. Thus, as compared to the case where four captured images are acquired in four nonconsecutive frames, information on a change in the situation surrounding a vehicle that has arisen between two difference images is less likely to be left out.

The difference image generator 108 according to the present embodiment generates a difference image 1 from the captured image 1 acquired in the frame F1 and captured while the light emitter 102 is on and the captured image 2 acquired in the frame F2 following the frame F1 and captured while the light emitter 102 is dimmed, and generates a difference image 2 from the captured image 3 acquired in the frame F3 following the frame F2 and captured while the light emitter 102 is on and the aforementioned captured image 2. Thus, the two difference images 1 and 2 are generated from the three consecutive captured images 1 to 3. The difference image 1 or the difference image 2 represents a difference between a captured image captured while the light emitter 102 is on and a captured image captured while the light emitter 102 is dimmed (while being dimmed includes while being off). Therefore, an influence of light from the surrounding environment is suppressed. In other words, the region that is illuminated with the light emitted by the light emitter 102 is mainly captured, and thus an influence of light from the surrounding environment or a shadow associated with such light is reduced, and this leads to an increase in the accuracy of image recognition where a difference image generated from captured images is used.

Second Embodiment

Figure 6:
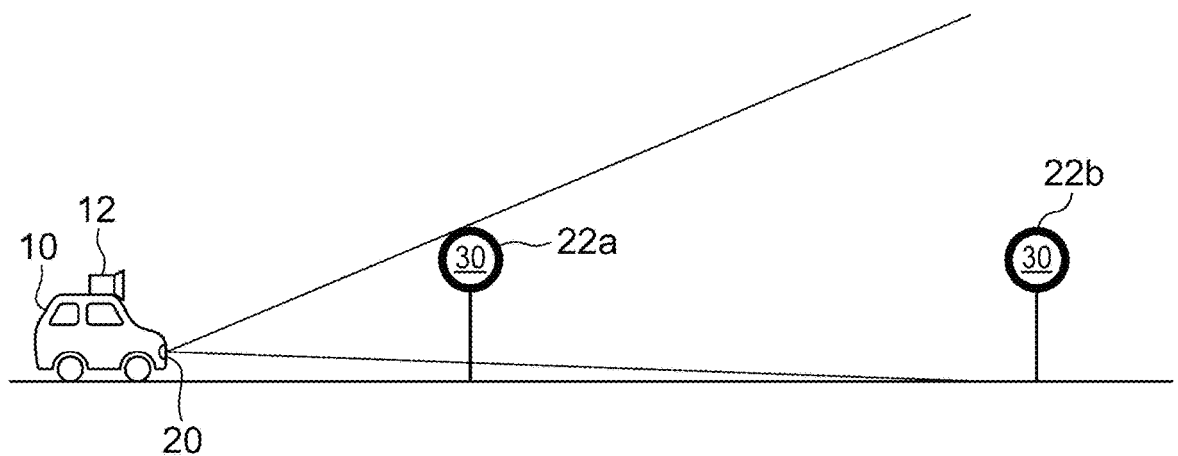
FIG. 6 is a schematic diagram illustrating a state in which a plurality of traffic signs located at different distances from a vehicle are illuminated by a light emitter of a vehicle.
Figure 7:
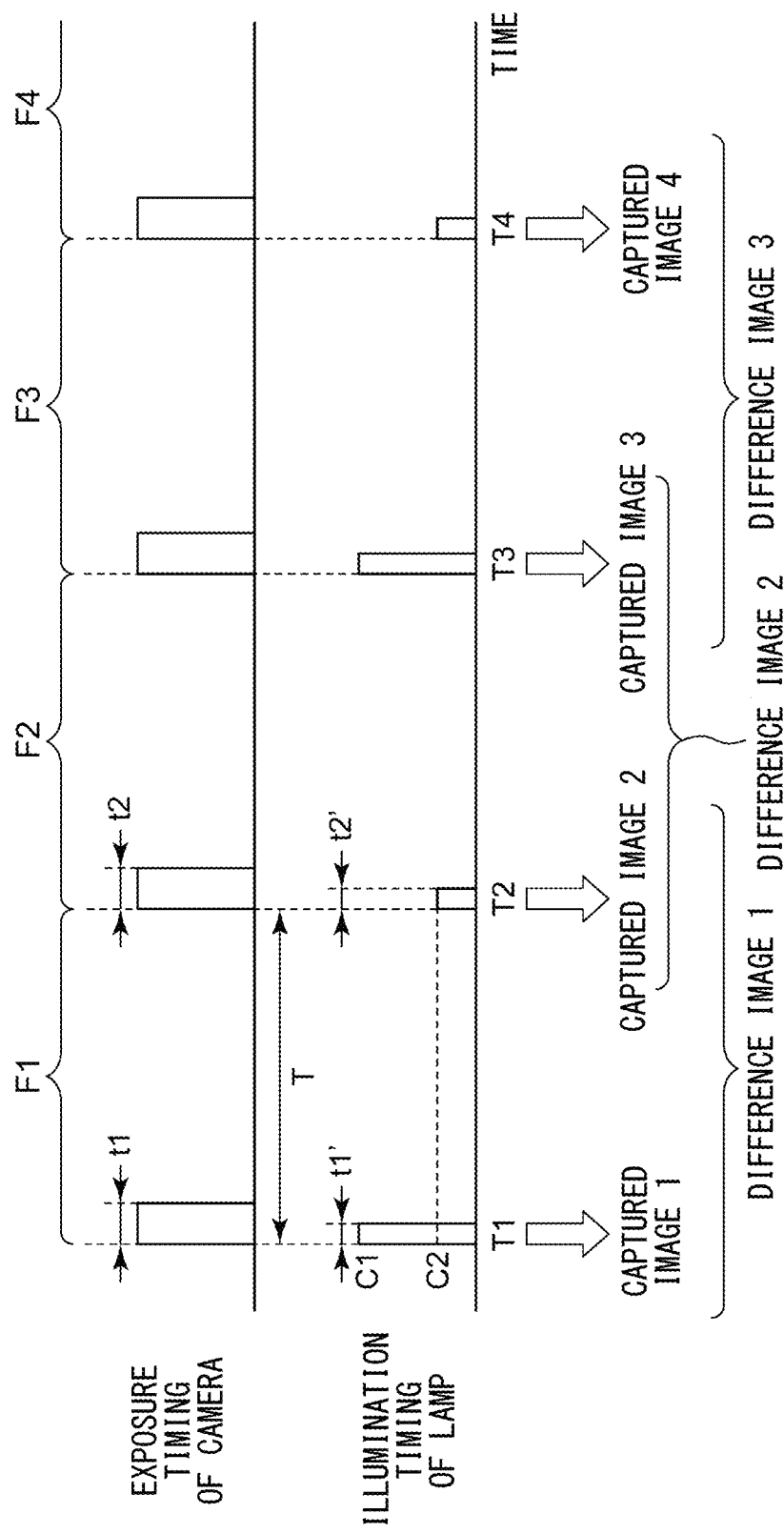
FIG. 7 is a schematic diagram illustrating a modification example of image processing performed by an imaging system according to an embodiment.
Figure 8:
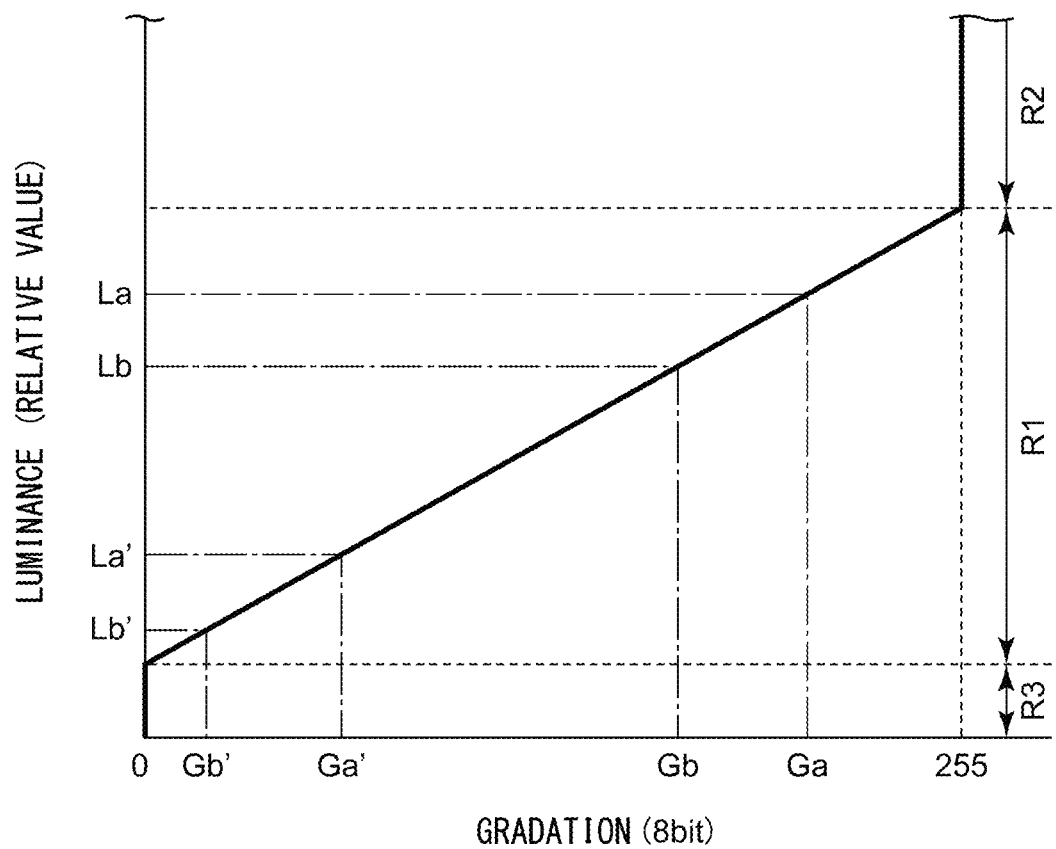
FIG. 8 is a schematic diagram illustrating a relationship between the luminance value of a target detected in an imager according to an embodiment and the gradation value detected.
Figure 9A:
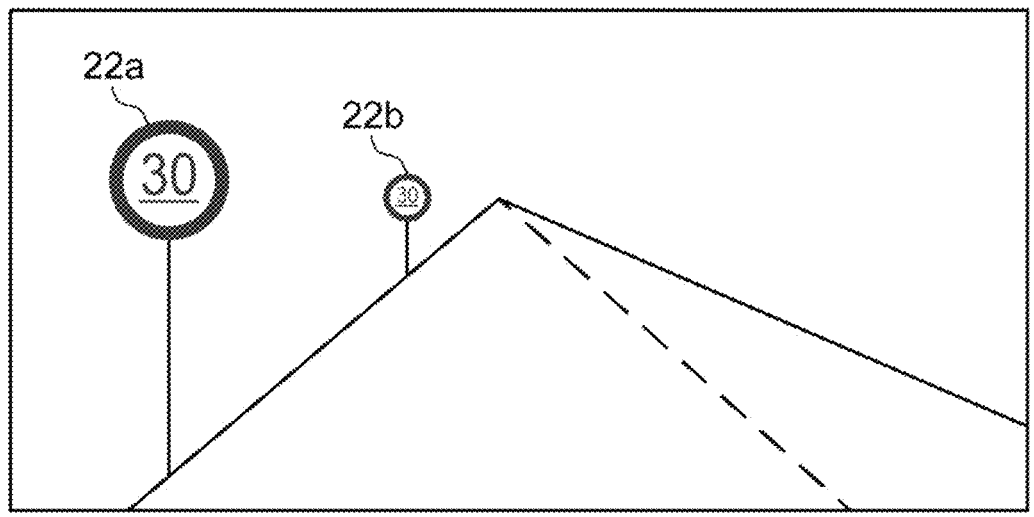
FIG. 9A illustrates a captured image 1.

Next, a method of identifying a plurality of traffic signs (an example of a traffic participant 14) located at different distances from a host vehicle will be described. FIG. 6 is a schematic diagram illustrating a state in which a plurality of traffic signs located at different distances from a vehicle are illuminated by a light emitter of the vehicle. FIG. 7 is a schematic diagram illustrating a modification example of image processing performed by an imaging system according to the present embodiment. FIG. 8 is a schematic diagram illustrating a relationship between the luminance value of a target detected in an imager according to the present embodiment and the gradation value detected. FIG. 9A illustrates a captured image 1, and FIG. 9B illustrates a captured image 2.

Traffic signs 22a and 22b illustrated in FIG. 6 are at different distances from a vehicle 10, and when reflected light L3' from the traffic sign 22a and reflected light L3' from the traffic signs 22b enter a camera 12, their luminance values detected by a controller 106 differ from each other. For example, as illustrated in FIG. 7, a camera captures images of the surroundings of the vehicle successively at a predetermined frame rate. Specifically, at a timing T1 of a frame F1, the camera starts the exposure (time t1) and the lamp starts the illumination (time t1' time t1) at a luminous intensity C1. As a result, a first captured image 1 is obtained. Next, at a timing T2 of a frame F2, the camera starts the exposure (time t2=time t1) and the lamp starts the illumination (time t1'=time t2'<time t2) at a luminous intensity C2 (0<C2<C1). As a result, a second captured image 2 is obtained.

The two obtained images include the two traffic signs 22a and 22b of different luminance values. Then, based on the relationship between the luminance value and the gradation illustrated in FIG. 8, the traffic sign 22a with a luminance value La acquired by the camera 12 at a timing at which the traffic sign 22a is illuminated by the lamp at the luminous intensity C1 is recognized as the traffic sign 22a with a gradation Ga in the captured image 1. In a similar manner, the traffic sign 22b with a luminance value Lb acquired by the camera 12 at a timing at which the traffic sign 22b is illuminated by the lamp at the luminous intensity C1 is recognized as the traffic sign 22b with a gradation Gb in the captured image 1. In a similar manner, the traffic sign 22a with a luminance value La' acquired by the camera 12 at a timing at which the traffic sign 22a is illuminated by the lamp at the luminous intensity C2 is recognized as the traffic sign 22a with a gradation Ga' in the captured image 2. In a similar manner, the traffic sign 22b with a luminance value Lb' acquired by the camera 12 at a timing at which the traffic sign 22b is illuminated by the lamp at the luminous intensity C2 is recognized as the traffic sign 22b with a gradation Gb' in the captured image 2.

Figure 9B:
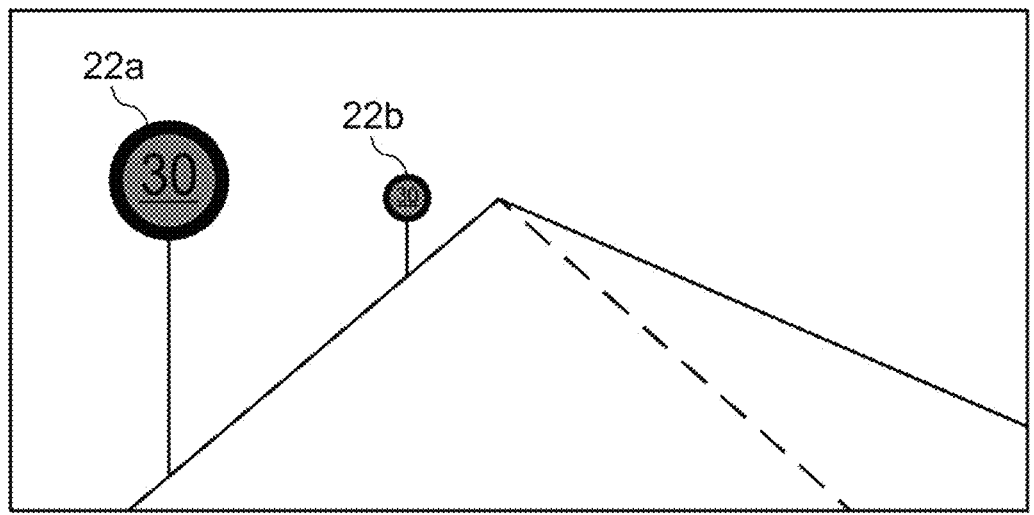
FIG. 9B illustrates a captured image 2.

When the luminance values La, Lb, La', and Lb' of the traffic signs 22a and 22b in the captured images 1 and 2 are included in the detection range (dynamic range R1) of the camera, the contents of the traffic signs 22a and 22b can be identified in either of the captured images, as illustrated in FIG. 9A or FIG. 9B. The difference image generator 108 of the controller 106 generates a difference image 1 from the captured image 1 and the captured image 2. Thus, the difference image 1 including information only on reflected light L3' is obtained, and an influence of reflected light L1' of natural ambient light L1 and illumination light L2 from another traffic participant 14 can be suppressed. This results in an increase in the accuracy of recognizing a situation by use of a captured image or a difference image in ADAS or automatic driving.

Meanwhile, not all traffic participants 14 can be identified with the luminous intensity C1 or C2 of a predetermined lamp. A reason for this is that different traffic participants have different reflectances and the brightness of reflected light L3' that reaches the camera differs depending on the distance from the traffic participants. Therefore, the inventors of the present application have conceived of a technique of obtaining a difference image that can broaden the range of targets with identifiable brightness.

Figure 10:
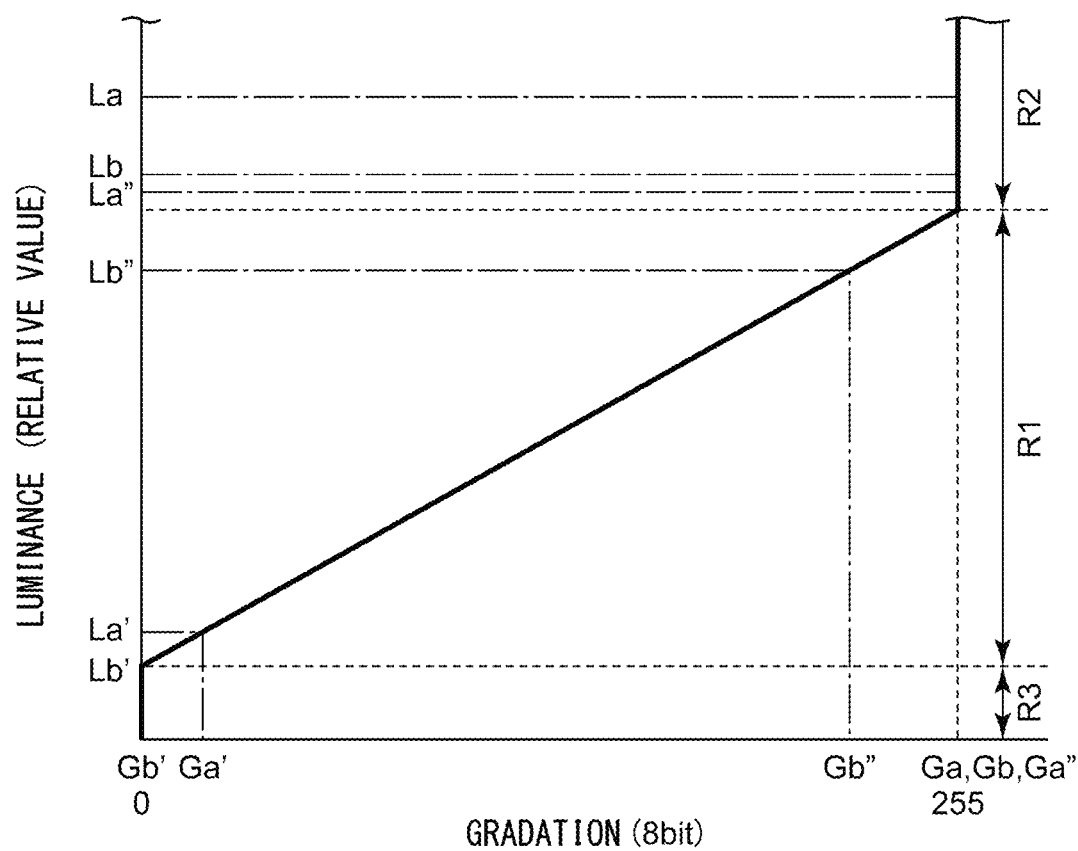
FIG. 10 is a schematic diagram illustrating a relationship between the luminance value of a target detected in an imager in another situation according to an embodiment and the gradation value detected.
Figure 11:
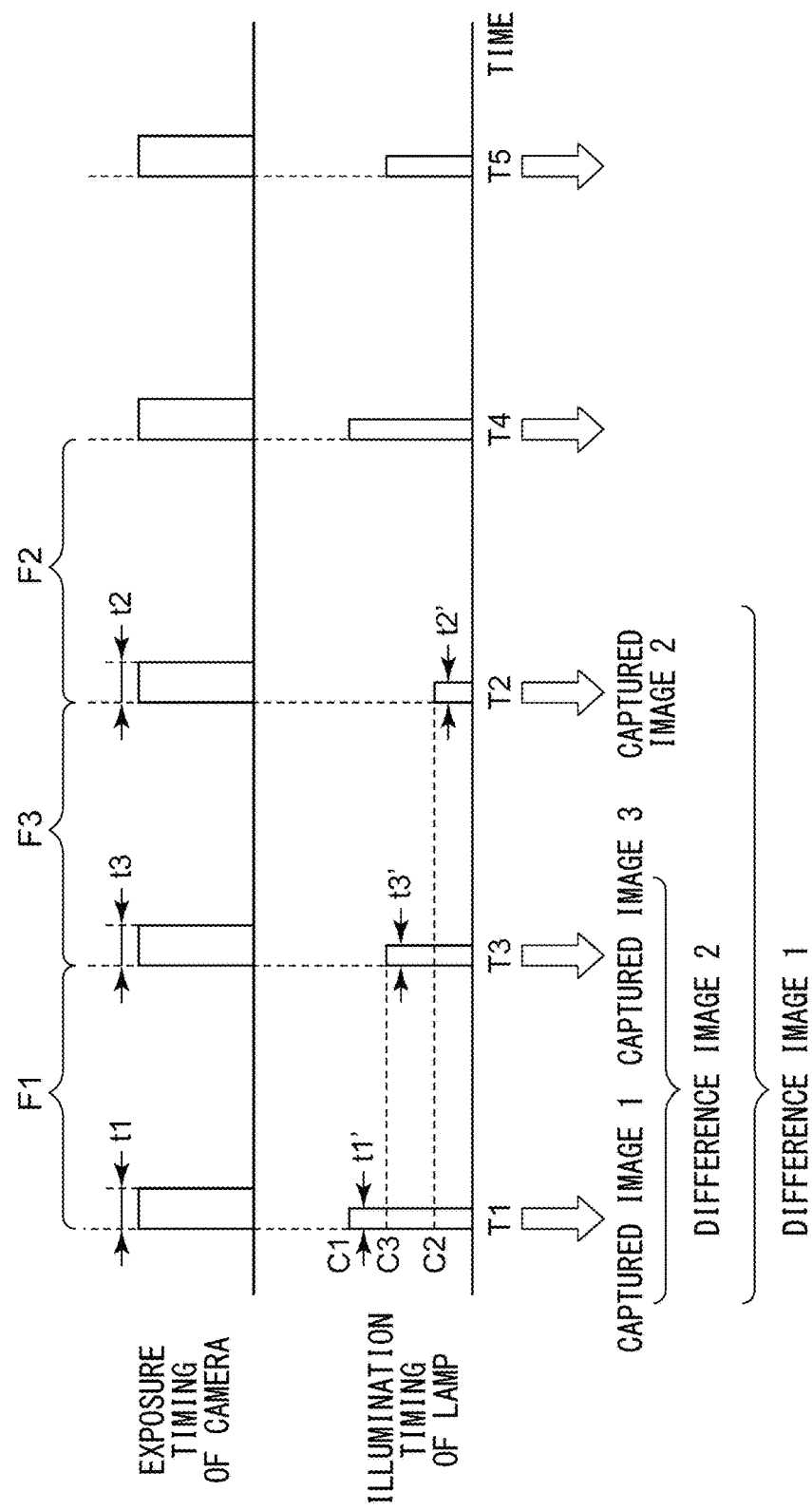
FIG. 11 is a schematic diagram illustrating another modification example of image processing performed by an imaging system according to an embodiment.
Figure 12A:
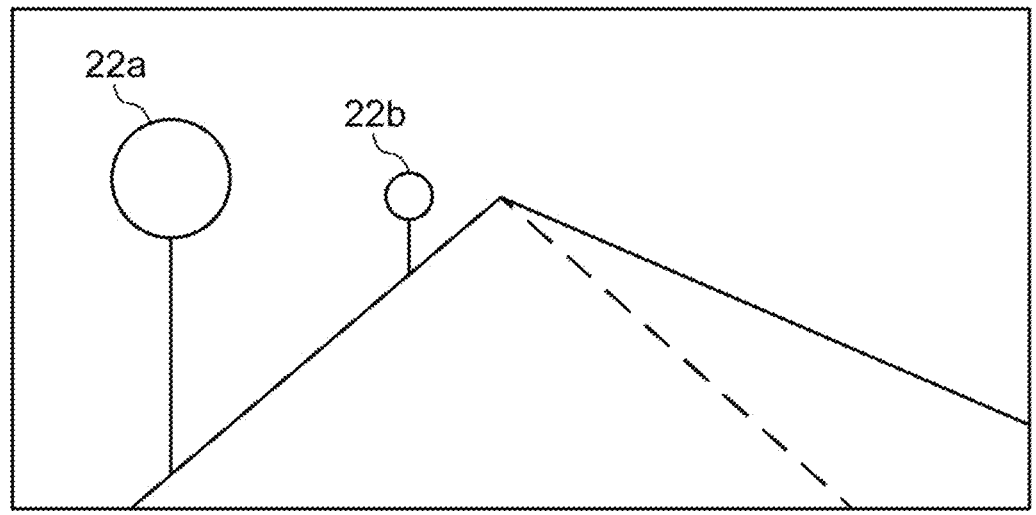
FIG. 12A illustrates a captured image 1 acquired by a camera at a timing at which a lamp provides illumination at a luminous intensity $C1$.

FIG. 10 is a schematic diagram illustrating a relationship between the luminance value of a target detected in the imager in another situation according to the present embodiment and the gradation value detected. FIG. 11 is a schematic diagram illustrating another modification example of image processing performed by the imaging system according to the present embodiment. FIG. 12A illustrates a captured image 1 acquired by the camera 12 at a timing at which the lamp provides illumination at a luminous intensity C1, FIG. 12B illustrates a captured image 2 acquired by the camera 12 at a timing at which the lamp provides illumination at a luminous intensity C2, and FIG. 12C illustrates a captured image 3 acquired by the camera 12 at a timing at which the lamp provides illumination at a luminous intensity C3.

For example, depending on the distance between the host vehicle and a traffic sign, the luminous intensity of the light emitter may be too high. In that case, the relationship between the luminance value of the target detected in the imager and the gradation value detected is included in a range R2 of white-clipping illustrated in FIG. 10. Therefore, the traffic sign 22a of the luminance value La acquired by the camera 12 at a timing at which the lamp provides illumination at the luminous intensity C1 has the gradation Ga (gradation value of 255) in the captured image 1 and is recognized as pure white. In a similar manner, the traffic sign 22b of the luminance value Lb acquired by the camera 12 at a timing at which the lamp provides illumination at the luminous intensity C1 has the gradation Gb (gradation value of 255) in the captured image 1 and is recognized as pure white (see FIG. 12A).

Meanwhile, if the luminous intensity of the light emitter is too low, a sufficient amount of light may not reach a traffic sign that is far from the host vehicle. In that case, the relationship between the luminance value of the target detected in the imager and the gradation value detected is included in a range R3 of black-clipping illustrated in FIG. 10. Therefore, the traffic sign 22a of the luminance value La' acquired by the camera 12 at a timing at which the lamp provides illumination at the luminous intensity C2 has the gradation Ga' in the captured image 2, and the contents of the sign are recognized. In contrast, the traffic sign 22b of the luminance value Lb' acquired by the camera 12 at a timing at which the lamp provides illumination at the luminous intensity C2 has the gradation Gb' (gradation value of 0) in the captured image 2 and is recognized as pitch black (see FIG. 12B).

Figure 12B:
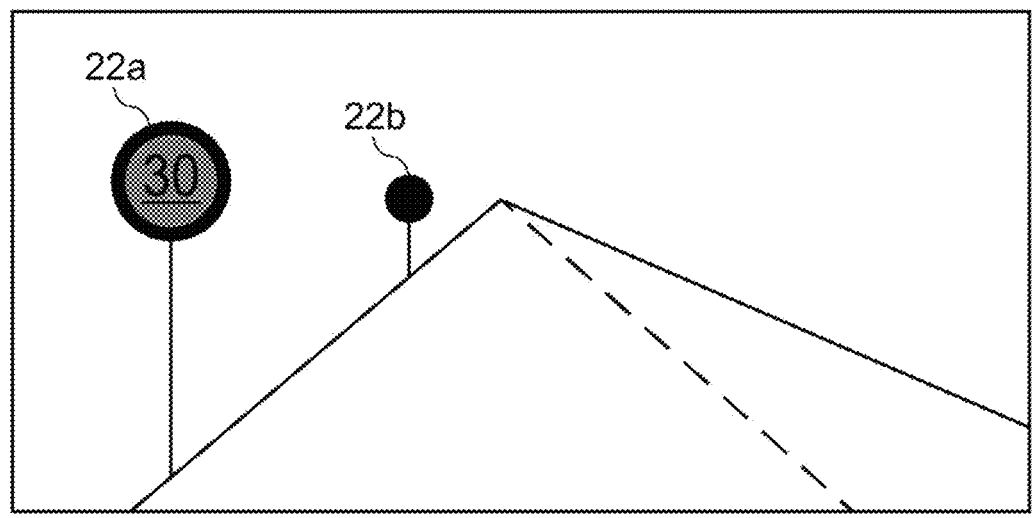
FIG. 12B illustrates a captured image 2 acquired by a camera at a timing at which a lamp provides illumination at a luminous intensity $C2$, and FIG.
Figure 12C:
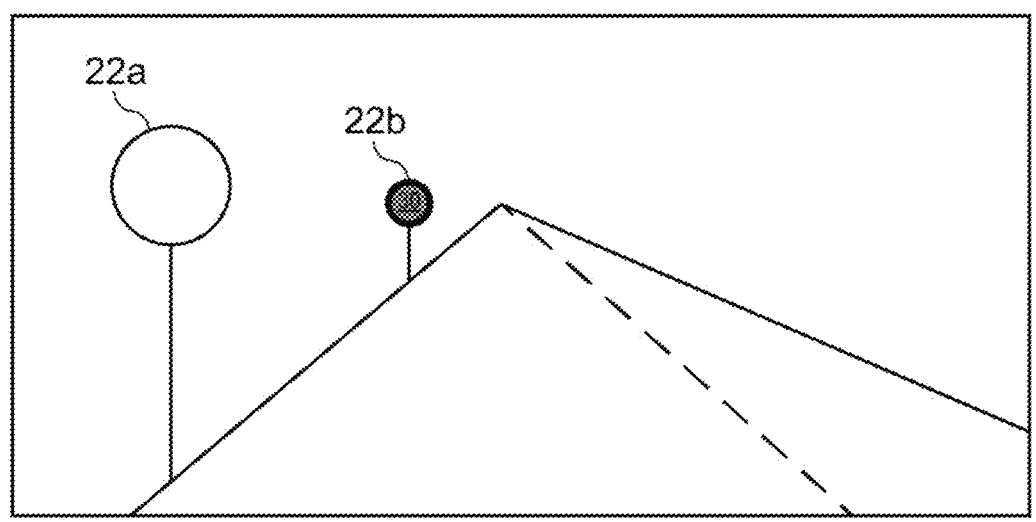

Therefore, in a difference image 1 generated from the captured image 1 illustrated in FIG. 12A and the captured image 2 illustrated in FIG. 12B, the contents of the traffic sign 22a can be identified, but the traffic sign 22b cannot be identified. Accordingly, in another modification example according to the present embodiment, as illustrated in FIG. 11, at a timing T3 of a frame F3 between a frame F1 and a frame F2, the camera starts the exposure (time t3), and the lamp starts the illumination (time t3'<time t3) at a luminous intensity C3 (C2<C3<C1). As a result, a third captured image 3 is obtained.

Next, at a timing T2 of the frame F2, the camera starts the exposure (time t2=time t1) and the lamp starts the illumination (time t1'=time t2'<time t2) at a luminous intensity C2 (0<C2<C1). As a result, a second captured image 2 is obtained. The traffic sign 22a of the luminance value La' acquired by the camera 12 at a timing at which the lamp provides illumination at the luminous intensity C3 has the gradation Ga" (gradation value of 255) in the captured image 3 and is recognized as pure white. Meanwhile, the traffic sign 22b of the luminance value Lb" acquired by the camera 12 at a timing at which the lamp provides illumination at the luminous intensity C3 is recognized as having the gradation Gb" (gradation value≠255) in the captured image 3 (see FIG. 12C).

Figure 13A:
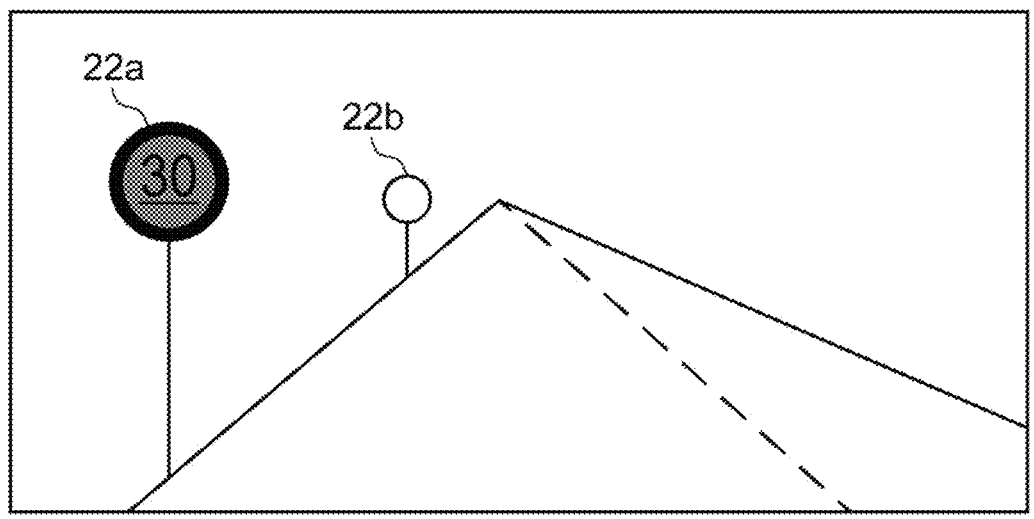
FIG. 13A illustrates a difference image 1.
Figure 13B:
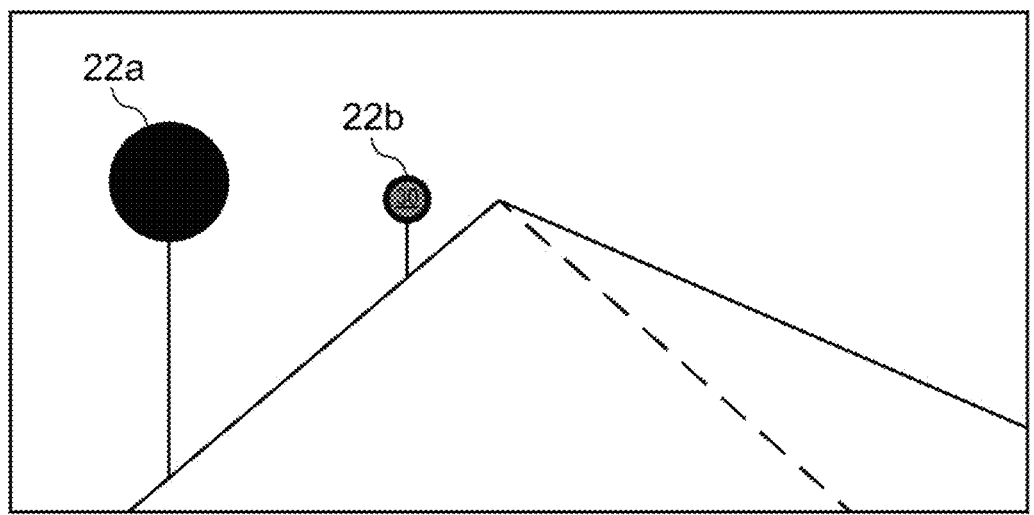
FIG. 13B illustrates a difference image 2.

FIG. 13A illustrates a difference image 1, and FIG. 13B illustrates a difference image 2. As described above, the difference image generator 108 of the controller 106 generates a difference image 1 from a captured image 1 and a captured image 2 and generates a difference image 2 from the captured image 1 and a captured image 3. Thus, the difference images 1 and 2 that include information only on reflected light L3' are obtained, and an influence of reflected light L1' of natural ambient light L1 or illumination light L2 from another traffic participant 14 can be suppressed. Moreover, the traffic sign 22b, which cannot be identified based only on the captured image 1 and the captured image 2, can be identified when the captured image 3 is used. This results in an increase in the accuracy of recognizing a situation by use of a captured image or a difference image in ADAS or automatic driving. Herein, combinations of two captured images used to generate a difference image are not necessarily limited to the combinations described above. For example, a difference image 2 may be generated from a captured image 2 and a captured image 3.

As described above, the imaging system 100 according to the present embodiment includes the difference image generator 108 that generates (n−1) difference images from n captured images captured by the imager 104. The difference image generator 108 generates a difference image 1 based on a captured image 1 included in the n captured images and captured while the light emitter 102 emits light at a luminous intensity C1 and a captured image 2 included in the n captured images and captured while the light emitter 102 emits light at a luminous intensity C2 (0<C2<C1).

With this configuration, a difference image is generated based on at least two captured images captured under an illumination condition where the light emitter 102 emits light at different luminous intensities. Accordingly, a difference image that includes a target of identifiable brightness is more likely to be obtained while an influence of ambient light is reduced.

The difference image generator 108 generates a difference image 2 based on the captured image 1 and a captured image 3 captured while the light emitter 102 emits light at a luminous intensity C3 (C2<C3<C1). With this configuration, two difference images are generated in which the differences in the luminous intensity of the light emitter held when two captured images are captured differ from each other (C1−C2, C1−C3). Accordingly, the likelihood that at least one of the difference images includes a target of identifiable brightness increases.

The imaging system 100 further includes an identifier 110 that identifies a plurality of traffic signs in the surroundings of the vehicle. The identifier 110 can identify the traffic sign 22a included in the plurality of traffic signs from the difference image 1 and identify the traffic sign 22b included in the plurality of traffic signs from the difference image 2, as illustrated in FIG. 13A. This configuration increases the number of identifiable signs.

In other words, the identifier 110 can identify the traffic sign 22a located closer to the vehicle 10 than the traffic sign 22b from the difference image 1 and identify the traffic sign 22b located farther from the vehicle 10 than the traffic sign 22a from the difference image 2. Thus, even in a case where a plurality of signs are present at different distances, both signs can be identified.

Next, a method of acquiring a number of difference images without much increasing the frame rate will be described. As illustrated in FIG. 6, the difference image generator 108 of the imaging system 100 according to the present embodiment generates (n−1) difference images from n captured images (n is an integer no smaller than 3). The difference image generator 108 generates a difference image based on an image included in the n captured images and captured while the light emitter is on and an image included in the n captured images and captured while the light emitter is dimmed. In the case described below, three difference images are generated from four captured images.

As illustrated in FIG. 7, four captured images 1 to 4 are obtained in respective frames F1 to F4. The captured image 1 and the captured image 3 are images captured under the illumination from the lamp, and the captured image 2 and the captured image 4 are images captured with no illumination from the lamp (or while the lamp is dimmed).

In the imaging system 100 according to the present embodiment, a difference image 1 that includes information only on reflected light L3' is obtained from the captured image 1 and the captured image 2, a difference image 2 that includes information only on reflected light L3' is obtained from the captured image 2 and the captured image 3, and a difference image 3 that includes information only on reflected light L3' is obtained from the captured image 3 and the captured image 4.

According to this mode, three difference images that are only one less in number than the four captured images are obtained, and thus a desired number of difference images can be obtained without much increasing the frame rate. In a similar manner, 59 difference images can be obtained from 60 captured images, and thus difference images in a number that does not differ much from the number of the captured images can be obtained with little change in the frame rate. This configuration makes it possible to identify a situation surrounding a vehicle with higher accuracy by use of a larger number of difference images within a predetermined time.

In the example illustrated in FIG. 7, the imager 104 acquires the four captured images 1 to 4 in the four consecutive frames. Thus, as compared to the case where four captured images are acquired in four nonconsecutive frames, information on a change in the situation surrounding a vehicle that has arisen between two difference images is less likely to be left out.

The difference image generator 108 according to the present embodiment generates a difference image 1 from the captured image 1 acquired in the frame F1 and captured while the light emitter 102 is on and the captured image 2 acquired in the frame F2 following the frame F1 and captured while the light emitter 102 is dimmed, and generates a difference image 2 from the captured image 3 acquired in the frame F3 following the frame F2 and captured while the light emitter 102 is on and the aforementioned captured image 2. Thus, the two difference images 1 and 2 are generated from the three consecutive captured images 1 to 3. The difference image 1 or the difference image 2 represents a difference between a captured image captured while the light emitter 102 is on and a captured image captured while the light emitter 102 is dimmed (while being dimmed includes while being off). Therefore, an influence of light from the surrounding environment is suppressed. In other words, the region that is illuminated with the light emitted by the light emitter 102 is mainly captured, and thus an influence of light from the surrounding environment or a shadow associated with such light is reduced, and this leads to an increase in the accuracy of image recognition where a difference image generated from captured images is used.

Herein, the light emitter 102 is preferably configured to be capable of emitting light at a luminous intensity that is no less than 10 times a normal luminous intensity of a light source included in a vehicle lamp of the vehicle 10. A light source included in a vehicle lamp is, for example, an LED light source or a laser light source included in a headlamp or a daytime running lamp. The normal luminous intensity of a light source is, for example, a mean luminous intensity of a light distribution pattern formed by a vehicle headlamp included in the vehicle 10 and is in a range of from several thousands to several tens of thousands (1,000 to 90,000) [cd]. Then, the light emitter 102 is configured to have an instantaneous peak luminous intensity of no lower than several tens of thousands to 1,000,000 [cd] when the light emitter 102 turns on at an imaging timing. This configuration can further suppress an influence of light from the surrounding environment.

The imager 104 is exposed for the duration of T/x (=t1: x>1) within one frame period, where T is one frame period, as illustrated in FIG. 5. Herein, the light emitter 102 is configured to be capable of emitting light within the duration of T/x (time t1'≤time t1) and emitting light at a luminous intensity that is no less than x times a normal luminous intensity of a light source included in a vehicle lamp. In this manner, the exposure time can be shortened as light is emitted at a high output power in a short period of time. As a result, the proportion of an influence of natural ambient light L1 (e.g., the sunlight) on the captured images 1 to 4 can be reduced.

The light emitter 102 may emit light at a peak wavelength of 940±20 nm, as described above. Light of such a near-infrared wavelength is not included in ambient light in a large amount. Therefore, as ambient light and light of a near-infrared wavelength are differentiated by the imager, a situation surrounding the vehicle illuminated with the light of a near-infrared wavelength can be identified with high accuracy.

The light emitter or the imager may be included in a vehicle lamp or provided outside a vehicle lamp.

While the preferred embodiments of the present disclosure have been described using specific terms, such description is for illustrative purposes only, and it is to be understood that changes and variations may be made without departing from the spirit or scope of the appended claims.

What is claimed is:

1. An imaging system, comprising:
a light emitter that emits light toward surroundings of a vehicle;
an imager that captures an image of a range including a region that is illuminated with light emitted by the light emitter; and
a difference image generator that generates (n−1) difference images from n captured images captured by the imager (n is an integer no smaller than 3), wherein
the difference image generator generates the difference images based on an image included in the n captured images and captured while the light emitter is on and an image included in the n captured images and captured while the light emitter is dimmed,
the imager is exposed for a duration of T/x (x>1) within one frame period, wherein T represents one frame period, and
the light emitter is configured to be capable of emitting light within the duration of T/x and emitting light at a luminous intensity that is no less than x times a luminous intensity of a light source included in a vehicle lamp.

2. The imaging system according to claim 1, wherein the imager acquires the n captured images in n consecutive frames.

3. The imaging system according to claim 2, wherein the difference image generator
generates a first difference image of the difference images from a first captured image acquired in a first frame and captured while the light emitter is on and a second captured image acquired in a second frame following the first frame and captured while the light emitter is dimmed, and
generates a second difference image of the difference images from a third captured image acquired in a third frame following the second frame and captured while the light emitter is on and the second captured image.

4. An imaging system, comprising:
a light emitter that emits light toward surroundings of a vehicle;
an imager that captures an image of a range including a region that is illuminated with light emitted by the light emitter; and
a difference image generator that generates (n−1) difference images from n captured images captured by the imager (n is an integer no smaller than 3), wherein
the difference image generator generates the difference images based on an image included in the n captured images and captured while the light emitter is on and an image included in the n captured images and captured while the light emitter is dimmed, and
the light emitter emits light at a peak wavelength of 940±20 nm.

5. The imaging system according to claim 4, wherein the imager acquires the n captured images in n consecutive frames.

6. The imaging system according to claim 5, wherein the difference image generator generates a first difference image of the difference images from a first captured image acquired in a first frame and captured while the light emitter is on and a second captured image acquired in a second frame following the first frame and captured while the light emitter is dimmed, and generates a second difference image of the difference images from a third captured image acquired in a third frame following the second frame and captured while the light emitter is on and the second captured image.

7. An imaging system, comprising:

a light emitter that emits light toward surroundings of a vehicle;

an imager that captures an image of a range including a region that is illuminated with light emitted by the light emitter; and a difference image generator that generates (n−1) difference images from n captured images captured by the imager, wherein the difference image generator generates the difference images based on a first captured image included in the n captured images and captured while the light emitter emits light at a first luminous intensity C1 and a second captured image included in the n captured images and captured while the light emitter emits light at a second luminous intensity C2 (0<C2<C1).

8. The imaging system according to claim 7, wherein the difference image generator generates the difference images based on the first captured image and a third captured image captured while the light emitter emits light at a third luminous intensity C3 (C2<C3<C1).

9. The imaging system according to claim 8, wherein the difference image generator generates a first difference image from the first captured image and the second captured image, and generates a second difference image from the first captured image and the third captured image.

10. The imaging system according to claim 9, further comprising:

an identifier that identifies a plurality of signs in the surroundings of the vehicle, wherein the identifier identifies a first sign included in the plurality of signs from the first difference image, and identifies a second sign included in the plurality of signs from the second difference image.

11. The imaging system according to claim 10, wherein the identifier identifies the first sign located closer to the vehicle than the second sign from the first difference image, and identifies the second sign located farther from the vehicle than the first sign from the second difference image.

12. The imaging system according to claim 7, wherein the imager acquires the n captured images in n consecutive frames.

13. The imaging system according to claim 7, wherein the light emitter is configured to be capable of emitting light at a luminous intensity that is no less than 10 times a normal luminous intensity of a light source included in a vehicle lamp.

14. The imaging system according to claim 13, wherein the imager is exposed for a duration of T/x (x>1) within one frame period, wherein T represents one frame period, and the light emitter is configured to be capable of emitting light within the duration of T/x and emitting light at a luminous intensity that is no less than x times a luminous intensity of the light source.

15. The imaging system according to claim 7, wherein the light emitter emits light at a peak wavelength of 940±20 nm.

* * * * *